United States Patent
Verhoeven

(10) Patent No.: US 12,344,132 B2
(45) Date of Patent: Jul. 1, 2025

(54) METHOD AND SEAT ADJUSTMENT SYSTEM FOR SUPPORTING RELAXATION OF AN OCCUPANT SITTING ON A VEHICLE SEAT OF A MOTOR VEHICLE

(71) Applicants: HYUNDAI MOTOR COMPANY, Seoul (KR); Kia Corporation, Seoul (KR)

(72) Inventor: Rolf Verhoeven, Frankfurt am Main (DE)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 270 days.

(21) Appl. No.: 17/889,050

(22) Filed: Aug. 16, 2022

(65) Prior Publication Data
US 2023/0347794 A1    Nov. 2, 2023

(30) Foreign Application Priority Data
Apr. 28, 2022   (DE) .......................... 102022204114.3

(51) Int. Cl.
  *B60N 2/02*   (2006.01)
  *B60N 2/04*   (2006.01)
  *B60W 60/00*  (2020.01)

(52) U.S. Cl.
  CPC ....... *B60N 2/0244* (2013.01); *B60N 2/02246* (2023.08); *B60N 2/04* (2013.01); *B60W 60/0013* (2020.02); *B60N 2/0268* (2023.08); *B60W 2540/215* (2020.02)

(58) Field of Classification Search
  CPC .... B60N 2/0244; B60N 2/02246; B60N 2/04; B60N 2/0268; B60W 60/0013; B60W 2540/215
  See application file for complete search history.

(56) References Cited

U.S. PATENT DOCUMENTS

2018/0170231 A1*  6/2018  Song .................. B60W 30/182
2021/0309128 A1  10/2021  Jung et al.

FOREIGN PATENT DOCUMENTS

DE     102010030308 B4 *  1/2019  ............. A61H 23/02
JP      2001095872 A  *  4/2001

OTHER PUBLICATIONS

DE102010030308B4 English Machine Translation (Year: 2010).*
JP2001095872A English Machine Translation (Year: 1999).*

* cited by examiner

*Primary Examiner* — Andrew J Cromer
(74) *Attorney, Agent, or Firm* — MORGAN, LEWIS & BOCKIUS LLP

(57) ABSTRACT

Method and seat adjustment system for supporting relaxation of an occupant sitting on a vehicle seat of a motor vehicle. A method for supporting relaxation of an occupant, in particular a driver, sitting on a vehicle seat of a motor vehicle comprises receiving a request for relaxation from the vehicle occupant by a seat controller of the motor vehicle; and moving at least a sitting portion of the vehicle seat back and forth according to a movement sequence specified by the seat controller defining a rocking motion for the occupant sitting on the vehicle seat, wherein the movement sequence is actuated by the seat controller via at least one of: at least one seat motion actuator integrated in or attached to the vehicle seat or an active suspension system of the motor vehicle.

15 Claims, 4 Drawing Sheets

Fig. 13
Fig. 14
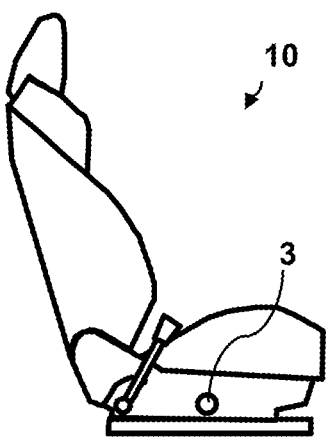
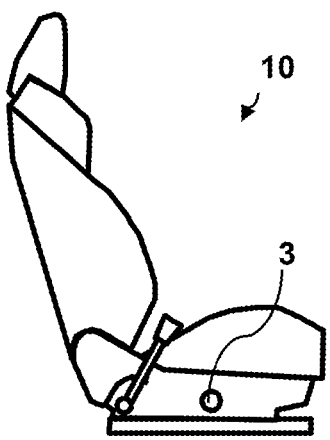
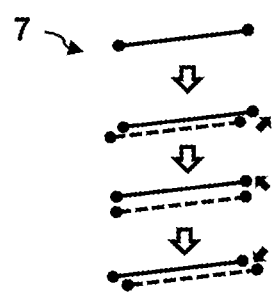
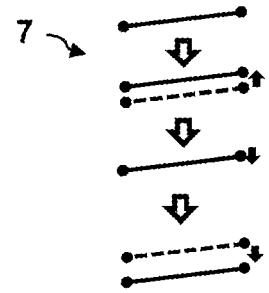

METHOD AND SEAT ADJUSTMENT SYSTEM FOR SUPPORTING RELAXATION OF AN OCCUPANT SITTING ON A VEHICLE SEAT OF A MOTOR VEHICLE

CROSS-REFERENCE TO RELATED APPLICATION

The present application claims the benefit of priority to German Patent Application No. 102022204114.3 filed on Apr. 28, 2022, the entire contents of which is incorporated herein for all purposes by this reference.

TECHNICAL FIELD

The present disclosure pertains to a method and a seat adjustment system for supporting relaxation of an occupant, in particular a driver, sitting on a vehicle seat of a motor vehicle as well as to a motor vehicle with such a seat adjustment system.

BACKGROUND

While it is important in case of manual driving to stay alert to control a vehicle under all circumstances, the main need of a vehicle operator may shift to relaxation or even sleep during autonomous and automatic driving. Currently however, vehicles are usually not adapted for creating an optimal relaxation or sleeping environment for the operator.

A conventional relaxation comfort seat for a vehicle is usually equipped with a mechanism for realizing a relaxation comfort mode to enable an occupant to take a relaxed comfortable posture for providing comfort and stability to the occupant. It is possible to realize the relaxation comfort mode of the seat even in a state in which a height of the seat is increased according to a body shape of the occupant.

The information disclosed in the Background section above is to aid in the understanding of the background of the present disclosure, and should not be taken as acknowledgement that this information forms any part of prior art.

SUMMARY

In light of the above, there is a need to find solutions that improve relaxation and resting for all vehicle occupants including the driver even during operation of the vehicle.

To this end, the present disclosure provides a method, a seat adjustment system and a motor vehicle.

According to one aspect of the disclosure, a method for supporting relaxation of an occupant, in particular a driver, sitting on a vehicle seat of a motor vehicle comprises receiving a request for relaxation from the vehicle occupant by a seat controller of the motor vehicle; and moving at least a sitting portion of the vehicle seat back and forth according to a movement sequence specified by the seat controller defining a rocking motion for the occupant sitting on the vehicle seat, wherein the movement sequence is actuated by the seat controller via at least one of: at least one seat motion actuator integrated in or attached to the vehicle seat or an active suspension system of the motor vehicle.

According to another aspect of the disclosure, a seat adjustment system for supporting relaxation of an occupant, in particular a driver, sitting on a vehicle seat of a motor vehicle comprises a seat controller configured to receive a request for relaxation from the vehicle occupant, to specify a movement sequence defining a rocking motion for the occupant sitting on the vehicle seat by moving at least a sitting portion of the vehicle seat back and forth and to actuate the movement sequence via at least one of: at least one seat motion actuator integrated in or attached to the vehicle seat or an active suspension system of the motor vehicle.

According to yet another aspect of the disclosure, a motor vehicle comprises a seat adjustment system according to the disclosure.

One aspect of the present disclosure is to provide an increased relaxation/sleeping environment within a motor vehicle by creating a rocking/swinging motion for the occupants, which is known to support relaxation/sleep. The rocking/swinging motion is achieved by moving at least a sitting portion of the vehicle seat back and forth, that is, backward and forward as well as up and down in one or various directions simultaneously or consecutively according to a specified sequence. The motion sequence can be actuated at least in two different ways, which may also be combined with each other, namely by seat motion actuators implemented in the seat structure and/or by the suspensions system of the vehicle (which also can be used to move the seats or portions of the seats). It is empirically known that a rocking/swinging motion improves relaxation. The present solution now offers the opportunity to apply such an improved relaxation during any operative phase of the vehicle, in particular during driving, e.g., under autonomous driving conditions.

It is understood that the term "vehicle" or "vehicular" or other similar term as used herein is inclusive of motor vehicles in general such as passenger automobiles including sports utility vehicles (SUV), buses, trucks, various commercial vehicles, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Advantageous embodiments and improvements of the present disclosure are found in the Detailed description Section.

According to an embodiment of the disclosure, the system may further comprise an autonomous driving unit configured to assess whether the motor vehicle operates in an autonomous driving mode. The seat controller may be configured to only actuate the movement sequence in case the autonomous driving mode fulfills predefined criteria. The method may correspondingly comprise assessing by the autonomous driving unit of the motor vehicle whether the motor vehicle operates in an autonomous driving mode.

Hence, the present disclosure can be particularly utilized in autonomous vehicles (e.g., level 3 or higher within the SAE classification), e.g., for purpose built vehicles, car sharing applications etc., in case the occupants like to use the autonomous driving period for relaxation, sleeping and/or power napping, for example.

According to an embodiment of the disclosure, the seat controller may be configured to move a seat frame and/or a seat base of the vehicle seat according to the movement sequence.

Hence, the sitting portion or even the whole seat may be moved according to the movement sequence by actuating the seat frame and/or the seat base. For example, a suspension-based solution may be used to create adequate movement of the seat at the seat base. In another example, various actuators may be implemented in the seat frame and/or seat base to move at least portions of the seat.

According to an embodiment of the disclosure, the vehicle seat may be mounted to an interior structure of the motor vehicle via at least one fixation element. The seat controller may be configured to actuate the movement sequence by moving the vehicle seat at the at least one fixation element.

For example, one or several eccentric motors may be installed at both lateral sides of a vehicle seat to move the seat in a rocking motion. Further, linear motors may be used alternatively or additionally to move portions of the seat in an orchestrated manner such that the sitting portion of the seat follows a rocking motion particularly suited for relaxation. For example, a sliding, linear and/or rotating movement may be generated at each seat fixation point on both lateral sides of the seat that are orchestrated to achieve rocking movements as a result that stimulate adequate relaxation for the occupant.

According to an embodiment of the disclosure, the seat adjustment system may comprise eccentric motors, linear motors, pneumatic systems and/or hydraulic systems to actuate the movement sequence.

The person of skill will readily conceive various convenient setups that make it possible to generate suitable rocking motions of the vehicle seat. For example, mechanical, pneumatic and/or hydraulic actuators may be implemented at the seat structure and/or the seat fixation to generate corresponding movements within the seat. On the other hand, various suspension system technologies are available that may fulfill this purpose including but not limited to air, pneumatic, hydraulic and/or electromagnetic suspension systems. Such suspension systems are usually optimized to reduce vibrations transferred to the occupants from the road through the wheels. However, these systems may equally well be used at the same time to generate a relaxing motion within the seat and thus a corresponding body movement of the respective occupant.

According to an embodiment of the disclosure, the system may further comprise an interior sensor system configured to assess whether obstacles are located within a passenger cabin of the motor vehicle limiting and/or prohibiting movement of the vehicle seat according to the movement sequence. The seat controller may be configured to adapt the movement sequence depending on detected obstacles. The method may correspondingly comprise assessing by the interior sensor system of the motor vehicle whether obstacles are located within a passenger cabin of the motor vehicle limiting and/or prohibiting movement of the vehicle seat according to the movement sequence.

For example, visual sensors like cameras, infrared sensors and/or ultrasound sensors or other suitable sensor technologies may be installed for this purpose inside the vehicle cabin, which are able to detect and optionally track any present obstacle, e.g., luggage or other components that are temporarily or permanently placed inside the cabin. The system may then compare the position and/or dimension of a detected obstacle with the definition of the movement sequence and the corresponding movement of the vehicle seat through the vehicle cabin. Based on this comparison the system may decide whether the movement sequence has to be changed and/or limited to a portion of the cabin where the movement of the seat is not in conflict with the obstacle. The system may also decide to completely block any movement of the seat at least temporarily as long as the obstacle is in the way.

Additionally or alternatively, the interior sensor system of the motor vehicle may be configured to assess physical dimensions of the occupant and corresponding available clearances within the passenger cabin for performing the movement sequence. In this case, the seat controller may be configured to adapt the movement sequence depending on the available clearances embodiment of the disclosure. The method may correspondingly comprise assessing by the interior sensor system of the motor vehicle physical dimensions of the occupant and corresponding available clearances within the passenger cabin for performing the movement sequence.

As above, various suitable sensor technologies may also be used to assess the dimensions of the vehicle occupant and/or the respective clearances within the vehicle cabin in order to assess whether the movement sequence needs to be adapted or completely prohibited, e.g., because the occupant is too large for certain seat movements.

According to an embodiment of the disclosure, the movement sequence may comprise linear movements, in particular along a horizontal axis and/or a vertical axis, arcuate movements and/or circular movements.

The disclosure will be explained in greater detail with reference to exemplary embodiments depicted in the drawings as appended.

BRIEF DESCRIPTION OF THE DRAWINGS

The accompanying drawings are included to provide a further understanding of the present disclosure and are incorporated in and constitute a part of this specification. The drawings illustrate the embodiments of the present disclosure and together with the description serve to explain the principles of the disclosure. Other embodiments of the present disclosure and many of the intended advantages of the present disclosure will be readily appreciated as they become better understood by reference to the following detailed description. The elements of the drawings are not necessarily to scale relative to each other. In the figures, like reference numerals denote like or functionally like components, unless indicated otherwise.

FIGS. 5, 6, 7, 8, 9, 10, 11, 12, 13 and 14 show exemplary movement sequences performed with the system of FIG. 1.

Although specific embodiments are illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

DETAILED DESCRIPTION OF THE EMBODIMENTS

Figure 1:
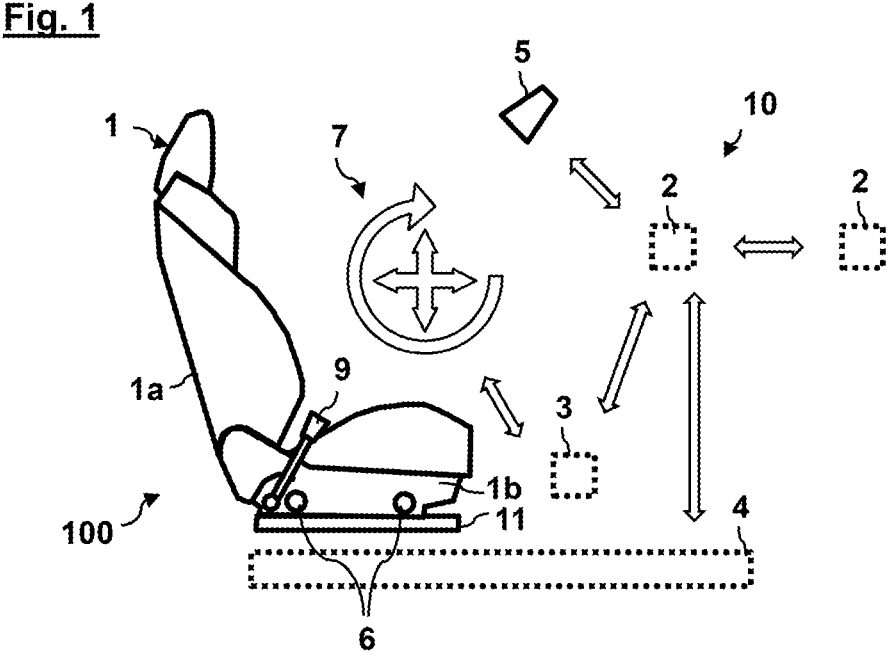
FIG. 1 schematically depicts a motor vehicle with a seat adjustment system for supporting relaxation of an occupant sitting on a vehicle seat of the motor vehicle according to an embodiment of the disclosure.

FIG. 1 schematically depicts a seat adjustment system 10 for supporting relaxation of an occupant, in particular a driver, sitting on a vehicle seat 1 of a motor vehicle 100.

The presently described system 10 provides an improved relaxation/sleeping solution in particular for autonomous/automatic driving applications where not only the passengers but also the vehicle operator may desire to rest when the vehicle is acting in an autonomous driving mode. As the primary customer need in autonomously driving vehicles often is relaxation/sleeping, the present solution may help to create an improved and satisfying environment for the vehicle occupants including the driver.

To accomplish this goal, the system 10 comprises a seat controller 2 configured to receive a request for relaxation from the vehicle occupant, e.g., via a vehicle controller like a dashboard, touch display or the like (not shown).

The seat controller 2 of the system 10 according to an exemplary embodiment of the present disclosure may be a processor (e.g., computer, microprocessor, CPU, ASIC, circuitry, logic circuits, etc.). The seat controller 2 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The system 10 further comprises an autonomous driving unit 8. The autonomous driving unit 8 may include a processor (e.g., computer, microprocessor, CPU, ASIC, circuitry, logic circuits, etc.) and an associated non-transitory memory storing software instructions which, when executed by the processor, provides various functions described hereinafter, e.g., assessing whether the motor vehicle 100 operates in an autonomous driving mode. For example, a driver of a vehicle may first activate an autonomous driving mode of the vehicle via the console and then turn on a relaxation mode, which activates the present system 10. While the present system 10 is activated it may continuously assess whether the vehicle 100 is still in the autonomous driving mode and whether the autonomous driving mode fulfills predefined criteria that allow the driver to rest and to abandon any control of the vehicle 100 at least for some limited time period.

The seat controller 2 is further configured to specify a movement sequence 7 defining a rocking motion for the occupant sitting on the vehicle seat 1 by moving at least a sitting portion of the vehicle seat 1 back and forth. There is extensive research available that indicates that a rocking motion improves relaxation/sleeping for persons sitting on seats, in particular for specific frequency ranges and/or amplitudes of the respective motion sequences.

Such a motion sequence may then only be performed in case the autonomous driving mode fulfills predefined criteria, which allow the driver to shift attention away from driving without introducing any risk for the vehicle and its occupants. In this case, the seat controller is then configured to actuate the movement sequence 7 via at least one seat motion actuator 3 integrated in or attached to the vehicle seat 1 and/or via an active suspension system 4 of the motor vehicle 100.

The movement sequence 7 may comprise linear movements, in particular along a horizontal axis X, Y and/or a vertical axis Z, but also arcuate movements and/or circular movements. These various movements may be used alone or in combination to generate an adequate rocking motion in the sitting portion of the vehicle 1 and thus for the occupant sitting on the seat 1. A few examples for such movement sequences will be explained further below with reference to FIGS. 5 to 14.

As mentioned before, the movement sequence 7 may be actuated by one or several seat motion actuators 3 implemented at or in the vehicle seat 1. These seat motion actuators 3 may be used for example to directly move, for example, a seat frame 1a and/or a seat base 1b of the vehicle seat 1 according to the movement sequence 7. Alternatively, or additionally, the movement sequence 7 may also be actuated by moving the vehicle seat 1 with the seat motion actuators 3 at one or several fixation elements 6, via which the vehicle seat 1 is mounted to an interior structure of the motor vehicle 100.

In the schematic example in FIG. 1, the seat 1 is affixed at its base 1b to a seat rail 11 by means of several fixation elements 6 in the usual vein known to the person of skill. Contrary to conventional systems, the fixation elements 6 are presently movable relative to the vehicle structure underneath via the seat motion actuators 3 in order to generate the movement sequence 7 of the seat 1.

Figure 2:
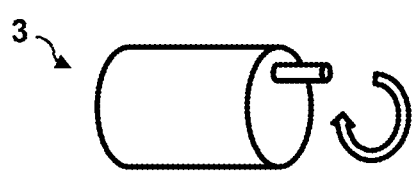
FIG. 2 schematically shows a seat motion actuator as used in the system of FIG. 1.
Figure 3:
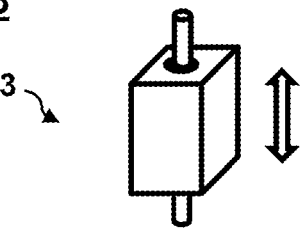
FIG. 3 schematically shows another seat motion actuator as used in the system of FIG. 1.

Two examples of seat motion actuators 3 suitable for the above purpose are shown in FIGS. 2 and 3. FIG. 2 schematically shows an eccentric motor that is installed such that a rotating movement along a horizontal (lateral) axis Y is possible. FIG. 3 on the other hand depicts a linear motor, which is arranged and configured to generate a linear movement in a vertical direction Z. By furnishing four fixation elements 6 of the seat 1 (two on each lateral side) with these or similar actuators, a rocking motion may be induced in the seat 1. However, will be clear that also may fulfill the present purpose.

However, the person of skill will readily acknowledge that also other variants with different configurations and different amounts of actuators may be used depending on the particular use case at hand. For example, pneumatic and/or hydraulic actuation systems may be used to stimulated rocking motions in case of truck seats, which are usually mainly provided to reduce vibrations otherwise transferred from the vehicle to the occupant.

Moreover, it is to be understood that alternatively, or additionally, also the suspension system 4 of the vehicle 100 may be used for the above purpose. To this end, corresponding pneumatic, hydraulic, electromagnetic and/or similar systems may be coupled with the vehicle seat 1 in an adequate manner.

Moreover, the seat adjustment system 10 may further comprise an interior sensor system 5, including various sensors (e.g., a hall sensor, etc.), configured to assess whether obstacles are located within a passenger cabin of the motor vehicle 100 limiting and/or prohibiting movement of the vehicle seat 1 according to the movement sequence 7. The seat controller 2 may then be configured to adapt the movement sequence 7 depending on detected obstacles.

Similarly, the interior sensor system 5 may be configured to assess physical dimensions of the occupant and corresponding available clearances within the passenger cabin for performing the movement sequence 7. Hence, the controller 2 may also be configured to adapt the movement sequence 7 depending on the available clearances.

Figure 4:
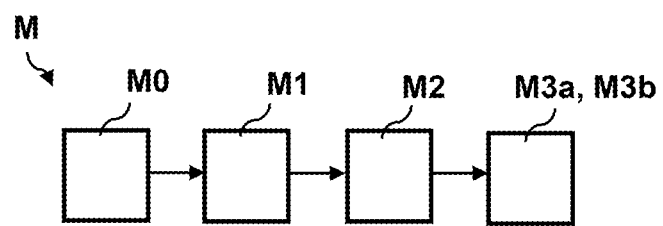
FIG. 4 shows a flow diagram of a method for supporting relaxation of an occupant sitting on a vehicle seat of the motor vehicle of FIG. 1.

The corresponding method M shown in FIG. 4 thus comprises under M0 assessing with the autonomous driving unit 8 whether the motor vehicle 100 operates in an autonomous driving mode, under M1 receiving a request for relaxation from the vehicle occupant by the seat controller 2 and under M2 moving at least the sitting portion of the vehicle seat 1 back and forth according to the movement sequence 7 specified by the seat controller 2 defining a rocking motion for the occupant sitting on the vehicle seat 1. Moreover, the method M optionally comprises under M3a assessing by the interior sensor system 5 whether obstacles are located within a passenger cabin of the motor vehicle 100 limiting and/or prohibiting movement of the vehicle seat 1 according to the movement sequence 7 and/or under M3b assessing by the interior sensor system 5 physical dimensions of the occupant and corresponding available clearances within the passenger cabin for performing the movement sequence 7.

Coming now to FIGS. 5 to 14, various examples can be provided on how to generate adequate motions in the vehicle seat 1 of FIG. 1 with the actuators 3 shown in FIGS. 2 and 3.

In FIGS. 5 to 8, overall four eccentric motors are used as actuators 3, one at each of four fixation elements 6 (two per lateral side of the seat 1). Each eccentric motor is configured to move the respective fixation 6 in a rotational movement, thereby creating a rocking motion in the seat.

Figure 5:
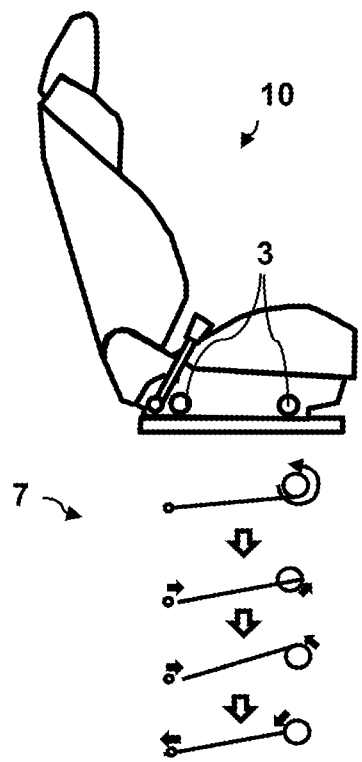
Figure 6:
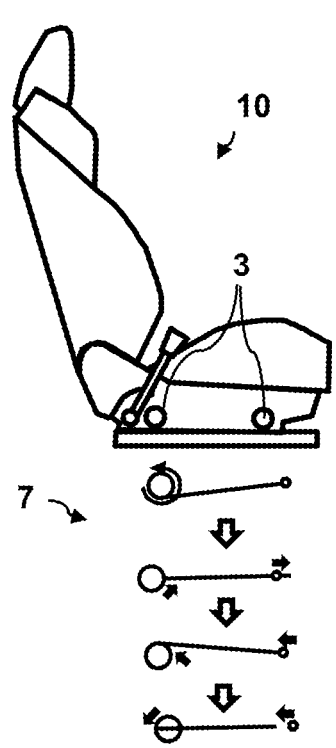
Figure 7:
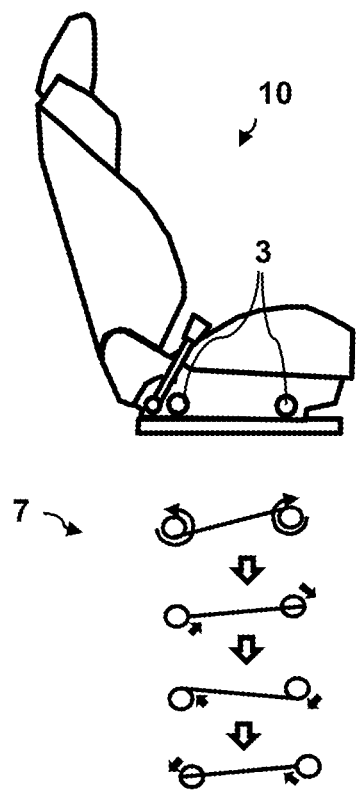
Figure 8:
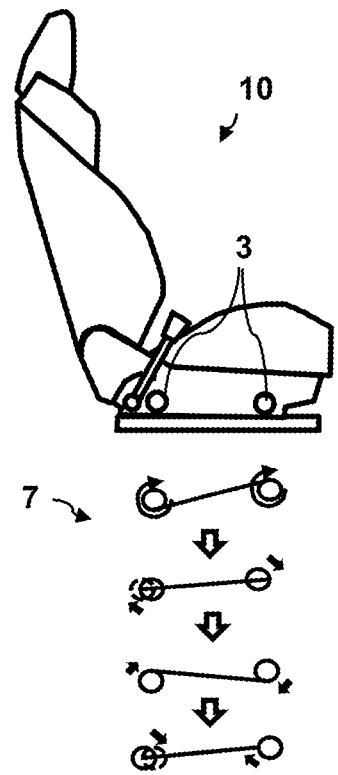

In the example of FIG. 5, the actuator 3 on the lower right (i.e., towards the front of the seat 1) is rotated counterclockwise (together with the corresponding actuator 3 on the other lateral side not visible here). In the example of FIG. 6, the ones in the back (left in FIG. 6) are rotated accordingly. In FIGS. 7 and 8 the actuators 3 are rotated together in an orchestrated manner. In all cases, a rocking motion is induced in the seat 1 at the fixation elements 6 (i.e., the hinges of the seat 1), either only in the front or back of the seat 1 (FIGS. 5 and 6) or in the full seat 1 (FIGS. 7 and 8).

The person of skill will readily acknowledge that various rocking patterns can thus be realized based on adequate control of the actuators 3. It is to be understood in this context that the actuators 3 may be installed adequately such that a seat belt 9 (including its attachment) is rotated along with the seat 1 such that no discomfort is caused for the occupant.

Figure 9:
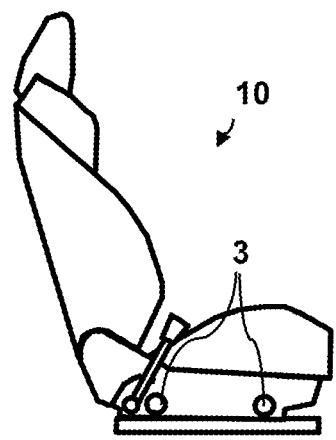
Figure 10:
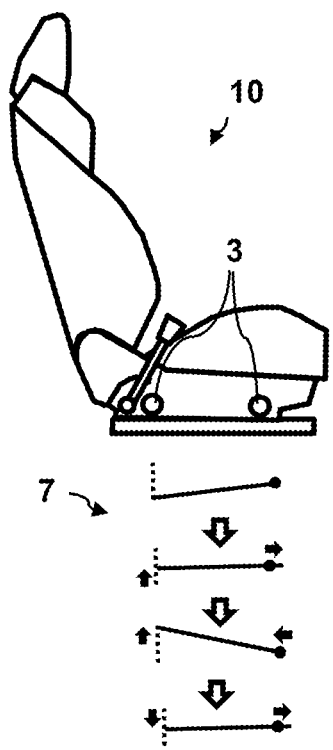
Figure 11:
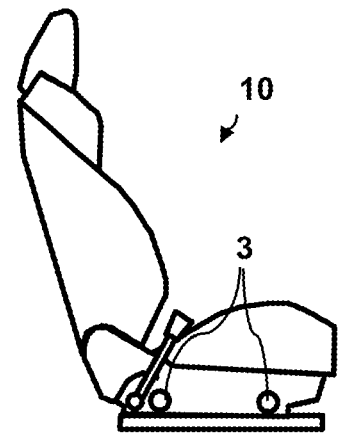
Figure 12:
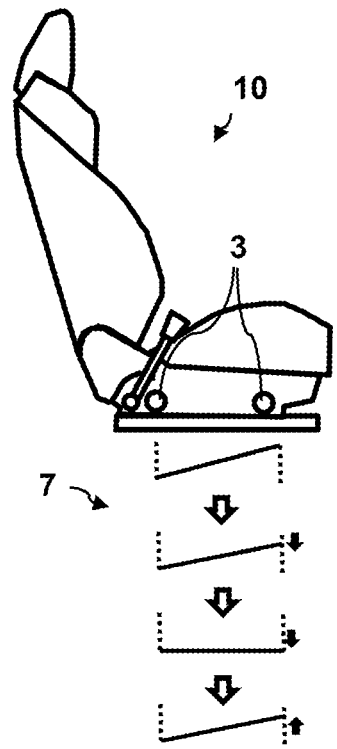

FIGS. 9 to 12 show alternative examples, where four linear motors are oriented along the vertical direction Z and are used as actuators 3 at the four fixation elements 6. In FIGS. 9 and 10 the front and, respectively, back actuators 3 are active, while in FIGS. 11 and 12 both front and back actuators 3 are used to stimulate up/down movement of the seat 1 according to various rocking patterns.

As an alternative example, FIGS. 13 and 14 show two embodiments where the seat 1 is only moved with one actuator 3 at each lateral side, which in this case is installed roughly in the middle between front and back of the seat 1 to move the whole seat base 1b (rotationally in FIG. 13 with an eccentric motor and linearly in FIG. 14 by means of a linear motor).

In the foregoing detailed description, various features are grouped together in one or more examples with the purpose of streamlining the disclosure. It is to be understood that the above description is intended to be illustrative, and not restrictive. It is intended to cover all alternatives, modifications and equivalents of the different features and embodiments. Many other examples will be apparent to one skilled in the art upon reviewing the above specification. The embodiments were chosen and described in order to explain the principles of the disclosure and its practical applications, to thereby enable others skilled in the art to utilize the disclosure and various embodiments with various modifications as are suited to the particular use contemplated.

REFERENCE LIST 1 vehicle seat
1a seat frame
1b seat base
2 seat controller
3 seat motion actuator
4 active suspension system
5 interior sensor system
6 fixation element
7 movement sequence
8 autonomous driving unit
9 seatbelt
10 seat adjustment system
11 seat rail
100 motor vehicle
X, Y horizontal axis
Z vertical axis
M method
M0-M3b method steps

What is claimed is:

1. A method for supporting relaxation of an occupant sitting on a vehicle seat of a motor vehicle, the method comprising:
receiving a request for relaxation from the occupant by a seat controller of the motor vehicle;
moving at least a sitting portion of the vehicle seat back and forth according to a movement sequence specified by the seat controller defining a rocking motion for the occupant sitting on the vehicle seat, wherein the movement sequence is actuated by the seat controller via at least one of: at least one seat motion actuator integrated in or attached to the vehicle seat; or an active suspension system of the motor vehicle; and
assessing, by an interior sensor system of the motor vehicle, physical dimensions of the occupant and corresponding available clearances within a passenger cabin of the motor vehicle for performing the movement sequence, wherein the seat controller adapts the movement sequence depending on the available clearances.

2. The method according to claim 1, further comprising:
assessing, by an autonomous driving unit of the motor vehicle, whether the motor vehicle operates in an autonomous driving mode, wherein the movement sequence is only actuated in case the autonomous driving mode fulfills predefined criteria.

3. The method according to claim 1, wherein a seat frame and/or a seat base of the vehicle seat is moved according to the movement sequence.

4. The method according to claim 1, wherein the vehicle seat is mounted to an interior structure of the motor vehicle via at least one fixation element, wherein the movement sequence is actuated by moving the vehicle seat at the at least one fixation element.

5. The method according to claim 1, wherein the movement sequence is actuated by at least one of eccentric motors, linear motors, pneumatic systems or hydraulic systems.

6. The method according to claim 1, wherein the movement sequence comprises at least one of linear movements along a horizontal axis (X, Y) and/or a vertical axis (Z), arcuate movements or circular movements.

7. The method according to claim 1, further comprising:
assessing, by the interior sensor system of the motor vehicle, whether obstacles are located within the passenger cabin of the motor vehicle limiting and/or prohibiting movement of the vehicle seat according to the movement sequence, wherein the seat controller adapts the movement sequence depending on detected obstacles.

8. A seat adjustment system for supporting relaxation of an occupant sitting on a vehicle seat of a motor vehicle, comprising:

a seat controller configured to receive a request for relaxation from the occupant, to specify a movement sequence defining a rocking motion for the occupant sitting on the vehicle seat by moving at least a sitting portion of the vehicle seat back and forth and to actuate the movement sequence via at least one of:

at least one seat motion actuator integrated in or attached to the vehicle seat; or an active suspension system of the motor vehicle; and an interior sensor system configured to assess physical dimensions of the occupant and corresponding available clearances within a passenger cabin of the motor vehicle for performing the movement sequence, wherein the seat controller is configured to adapt the movement sequence depending on the available clearances.

9. The seat adjustment system according to claim 8, further comprising:

an autonomous driving unit configured to assess whether the motor vehicle operates in an autonomous driving mode, wherein the seat controller is configured to only actuate the movement sequence in case the autonomous driving mode fulfills predefined criteria.

10. The seat adjustment system according to claim 8, wherein the seat controller is configured to move a seat frame and/or a seat base of the vehicle seat according to the movement sequence.

11. The seat adjustment system according to claim 8, wherein the vehicle seat is mounted to an interior structure of the motor vehicle via at least one fixation element, wherein the seat controller is configured to actuate the movement sequence by moving the vehicle seat at the at least one fixation element.

12. The seat adjustment system according to claim 8, wherein the seat adjustment system comprises at least one of eccentric motors, linear motors, pneumatic systems or hydraulic systems to actuate the movement sequence.

13. The seat adjustment system according to claim 8, wherein the movement sequence comprises at least one of linear movements along a horizontal axis (X, Y) and/or a vertical axis (Z), arcuate movements or circular movements.

14. A motor vehicle including the seat adjustment system according to claim 8.

15. The seat adjustment system according to claim 8, wherein the interior sensor system of the motor vehicle is further configured to assess whether obstacles are located within the passenger cabin of the motor vehicle limiting and/or prohibiting movement of the vehicle seat according to the movement sequence, wherein the seat controller is configured to adapt the movement sequence depending on detected obstacles.

* * * * *